(12) United States Patent
Farnham et al.

(10) Patent No.: US 6,399,729 B1
(45) Date of Patent: Jun. 4, 2002

(54) FLUOROMONOMER POLYMERIZATION

(75) Inventors: William Brown Farnham, Hockessin; Andrew Edward Feiring, Wilmington, both of DE (US); Patrick Edward Lindner, Parkersburg, WV (US)

(73) Assignee: E. I. du Pont de Nmeours and Company, Wilmington, DE (US)

( * ) Notice: Subject to any disclaimer, the term of this patent is extended or adjusted under 35 U.S.C. 154(b) by 0 days.

(21) Appl. No.: 09/450,106

(22) Filed: Nov. 29, 1999

Related U.S. Application Data

(60) Provisional application No. 60/110,282, filed on Nov. 30, 1998.

(51) Int. Cl.$^7$ .............................................. C08F 114/18
(52) U.S. Cl. ........................ 526/255; 526/206; 526/209; 526/250
(58) Field of Search ................................ 526/206, 209, 526/250, 255

(56) References Cited

U.S. PATENT DOCUMENTS

| | | | |
|---|---|---|---|
| 3,346,448 A | 10/1967 | Gilbert et al. | ................. 167/52 |
| 3,609,196 A | 9/1971 | Terrell | ................... 260/614 F |
| 5,182,342 A | 1/1993 | Feiring et al. | ............... 526/206 |
| 5,700,889 A | 12/1997 | Blair | .......................... 526/247 |

FOREIGN PATENT DOCUMENTS

| | | | |
|---|---|---|---|
| EP | 0 617 058 A | 9/1994 | ........... C08F/14/18 |
| EP | 0 694 523 | 1/1996 | ........... C07C/53/48 |

OTHER PUBLICATIONS

M. Hudlicky, "Chemistry of Organic Fluorine Compounds", 2nd Edition, Ellis Horwood, Chichester, UK, 2nd edition, 285–290 and 407–410, 1976.

L. G. Sprague, "Chemistry of Organic Fluorine Compounds II", M. Hudlicky and A. E. Pavlath, editors, American Chemical Society, Washinton, DC, pp. 729–731, 1995.

A. E. Feiring, "Chemistry of Organic Fluorine Compounds II", M. Hudlicky and A. E. Pavlath, editors, American Chemical Society, Washington, DC, p. 82, 1995.

The use of HFE–7100 and HFE–7200 as polymerization media as disclosed in "Research Disclosures", #40576, p. 81, Jan. 1998.

Grenfell, M.W., Hydrofluoroethers as Fluoromonomer Reaction Media, Research Disclosure, GB, Industrial Opportunities Ltd. Havant, 405, 81–82, Jan. 01, 1998.

*Primary Examiner*—Helen L. Pezzuto

(57) ABSTRACT

Chain transfer agents that are chlorine-free and liquid under polymerization conditions, useful for fluoromonomer polymerization, have the following formula:

$$R^1\text{—O—}R^2.$$

They are superior to common chain transfer agents such as chloroform in being safer and environmentally benign. They are also superior to gaseous chain transfer agents such as ethane because they do not enter the fluoromonomer gas recycle streams and so do not complicate the analysis and purification of those streams.

10 Claims, No Drawings

FLUOROMONOMER POLYMERIZATION

RELATED APPLICATIONS

This application claims benefit of U.S. Provisionl Application No. 60/110,282 filed Nov. 30, 1998.

FIELD OF THE INVENTION

This invention is in the field of fluoromonomer polymerization using chain transfer agents.

BACKGROUND OF THE INVENTION

In its simplest form, free-radical polymerization begins with the reaction of a free radical, generated by an initiator, with an olefin molecule to form a new free radical. This adds in turn to another olefin molecule in a polymerization cycle which continues until the growing radical chain is terminated by coupling or disproportionation with another radical chain, or by reaction with an initiator-generated radical. The rate of termination compared with the rate of polymerization affects the molecular weight and molecular weight distribution of the polymer, both critical properties. Because these termination mechanisms do not always give desirable molecular weights or molecular weight distributions and sometimes produce polymer molecules with unstable endgroups or bonds, chain transfer agents are often included in polymerization recipes. See for example U.S. Pat. Nos. 3,636,926 and 5,700,889. Chain transfer agents are molecules with labile atoms, often hydrogen. They give up the labile atom to a growing polymer chain, terminating it. In the process the chain transfer agent is converted to a free radical which initiates a new polymer chain by reacting with an olefin molecule, starting a new polymerization cycle. Chloroform is an example:

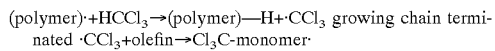

(polymer)·+HCCl$_3$→(polymer)—H+·CCl$_3$ growing chain terminated ·CCl$_3$+olefin→Cl$_3$C-monomer·

Though effective in fluoromonomer polymerization, chloroform has undesirable health and environmental effects. Hydrocarbons, such as ethane, are also used as chain transfer agents, and are free of the problems of chloroform. However, ethane is a gas. Many fluoromonomers are also gases, and polymerizations often include the recycling of monomers. The presence of chain transfer agents such as ethane in monomer recycle streams presents problems of analysis and purification that increase costs and the probability of contamination. Liquid hydrocarbons are unsuitable because to achieve low enough volatility so that they do not have a significant concentration in the gas phase, their molecular weights must be high. Fluoropolymers made with high molecular weight hydrocarbon chain transfer agents would have hydrocarbon end groups that would affect their properties and stability.

New chain transfer agents are needed that do not contain chlorine, are liquid at room temperature, and do not significantly affect the character of the polymer being made.

SUMMARY OF THE INVENTION

The present invention provides a chain transfer agent that is chlorine-free, liquid at room temperature, and similar in chemical composition to fluoropolymers made with them, that the fluoropolymer properties are not adversely affected. Thus the invention is a process comprising the polymerizing of fluoromonomer in the presence of initiator and chain transfer agent, said chain transfer agent having the formula

$$R^1\text{—O—}R^2 \quad (1)$$

wherein $R^1$ is a straight chain or branched saturated hydrocarbon group of 1 to 6 carbon atoms with the proviso that there is at least one hydrogen atom attached to the carbon next to oxygen, and $R^2$ is a straight chain or branched fluorocarbon group or hydrofluorocarbon group of formula $C_aH_bF_c$ wherein a is 2 to 6, b is 0 to 2a–1 and c is 2 to 2a+1 with the proviso that b+c=2a+1.

Another aspect of the invention is polymer containing endgroups characteristic of chain transfer agent having the formula (1)

$$R^1\text{—O—}R^2 \quad (1)$$

wherein $R^1$ and $R^2$ are as defined above.

DETAILED DESCRIPTION

Olefins are molecules containing a carbon-carbon double bond (>C=C<). The vinyl group (CH$_2$=CH—) is a member of the class of olefins. "Fluoromonomers" is used in this application to mean olefins that can be free-radically polymerized and that contain at least one fluorine atom, fluoroalkyl group, or fluoroalkoxy group attached to the vinyl group that undergoes polymerization. Useful fluoromonomers include, but are not limited to, vinyl fluoride; vinylidene fluoride; trifluoroethylene; chlorotrifluoroethylene (CTFE); 1,2-difluoroethylene; tetrafluoroethylene. (TFE); hexafluoropropylene (HFP); perfluoro(alkyl vinyl ethers). such as perfluoro(methyl vinyl ether)(PMVE), perfluoro(ethyl vinyl ether)(PEVE), and perfluoro(propyl vinyl ether)(PPVE); perfluoro(1,3-dioxole); perfluoro(2,2-dimethyl-1,3-dioxole) (PDD); CF$_2$=CFOCF$_2$CF(CF$_3$)OCF$_2$CF$_2$X wherein X is SO$_2$F, CO$_2$H, CO$_2$CH$_3$, CH$_2$OH, CH$_2$OCN or CH$_2$OPO$_3$H; CF$_2$=CFOCF$_2$CF$_2$SO$_2$F; F(CF$_2$)$_n$CH$_2$OCF=CF$_2$ wherein n is 1, 2, 3, 4, or 5; R$_4$CH$_2$OCF=CF$_2$ wherein R$_4$ is hydrogen or F(CF$_2$)$_m$— and m is 1, 2 or 3; and R$_5$OCF=CH$_2$ wherein R$_5$ is F(CF$_2$)$_z$— and z is 1, 2, 3, or 4; perfluorobutyl ethylene (PFBE); 3,3,3-trifluoropropene and 2-trifluoromethyl-3,3,3-trifluoro-1-propene. Preferred fluoromonomers include 2-trifluoromethyl-3,3,3-trifluoro-1-propene, PFBE, vinyl fluoride, vinylidene fluoride, TFE, HFP, PMVE, PEVE, PPVE, CTFE, and PDD.

The fluoromonomer may be polymerized alone to form a homopolymer if the fluoromonomer can be homopolymerized, or may be polymerized with one or more other fluoromonomers or other monomers, such as hydrocarbon monomers that are not fluoromonomers, to form a copolymer. If a copolymer is to be formed, the monomers chosen must be able to copolymerize. Fluorine-free monomers that copolymerize with some combinations of fluoromonomers include propylene and ethylene. Examples of useful homopolymers from fluoropolymers include polytetrafluoroethylene (PTFE) and polyvinylidene fluoride. Also usually classed with homopolymer PTFE are the modified PTFE polymers containing fluoromonomers other than TFE in such minor amounts that the modified polymers retain the non-melt-fabricable character of PTFE. Examples of useful copolymers include the copolymers of TFE with HFP and/or perfluoro(alkyl vinyl ethers) such as PPVE or PEVE, copolymers of TFE with PMVE, copolymers of TFE with PDD, and copolymers of TFE or CTFE with ethylene. Further examples include the copolymers of vinylidene fluoride with HFP, or with HFP and TFE. As implied above, copolymers may contain additional monomers beyond those named. TFE/ethylene copolymers, for example, are most useful if they include additional monomers that introduce bulky side groups such as PFBE, HFP, PPVE or 2-trifluoromethyl-3,3,3-trifluoro-1-propene, and elastomeric polymers frequently include low concentrations of cure site moieties derived from a cure site monomer.

The polymers of this invention include TFE and CTFE homopolymers; TFE or CTFE polymerized with one or more other fluoromonomers described above such that said other fluoromonomers are <1% by weight of the total polymer (wt. %); TFE or CTFE polymerized with 1 to 99 wt. % of one or more other fluoromonomers, preferably 1 to 50 wt. % of one or more other fluoromonomers, more preferably 1 to 20 wt. % of one or more other fluoromonomers, and most preferably 1 to 10 wt. % of one or more other fluoromonomers. In all cases, the wt. % values refer to the amount of comonomer incorporated in the polymer.

The TFE homopolymers of this invention are not melt fabricable. The copolymers of this invention are melt processible with melt viscosities, determined as described below, of up to $10^6$ Pa·s, preferably in the range $10^2$ to $10^6$ Pa·s, and most preferably in the range $10^3$ to $10^5$ Pa·s. Such fluoropolymers can be glassy, plastic, or elastomeric. They can be amorphous or partially crystalline, melt-fabricable or non-melt-fabricable. The fluoropolymers made by the process of this invention are normally solid at 15°–20° C. and can have any molecular weight (MW) suitable for the intended use. Generally, the weight average MW is at least 50,000 and can range up to much higher values, such as 1,000,000 and even higher.

The identity and proportion in the polymer of units derived from other monomers, fluorinated and fluorine-free, can have wide ranges depending on the physical, chemical, or electrical properties sought. Thus, the polymers of this invention can be plastic or elastomeric, generally according to the identity and proportion of units derived from monomers making up the major part of the polymer composition, as known in the art.

Polymers of this invention can be prepared by any of the known processes for making fluoropolymers. Such processes can be conducted, for example, in an aqueous or non-aqueous liquid medium, the latter including fluorocarbon and chlorofluorocarbon solvents and carbon dioxide, or in mixed media, i.e., hybrid processes, as well known in the art. The olefin, initiator, and chain transfer agent of formula (1) are added to the polymerization medium, i.e. the polymerization medium is not the chain transfer agent. The presence of the chain transfer agent in the polymerization reaction is in addition to the presence of a polymerization medium. The polymerization medium will normally constitute at least 40 wt. % of the polymerization system after polymerization is completed. As is also well known in the art, dispersion or suspension processes can be employed, and polymerization can be conducted in a batch, semi-batch, or continuous process.

Initiators commonly employed in aqueous polymerization of TFE copolymers are water-soluble free-radical initiators such as ammonium persulfate (APS), potassium persulfate (KPS), or disuccinic acid peroxide, or redox systems such as those based on potassium permanganate ($KMnO_4$), or a perfluoroalkyl sulfinate salt plus an oxidizing agent. Such initiators can be used in the process of this invention. Preferred initiators include APS, KPS, and $KMnO_4$.

Initiators for nonaqueous polymerization or polymerization in the solvent phase of a suspension polymerization include perfluoropropionyl peroxide (3P) and ($CF_3CF_2CF_2OCF$ ($CF_3$) COO—$)_2$ (hexafluoropropylene oxide dimer peroxide also known as HFPO dimer peroxide).

Surfactants for aqueous polymerizations include ammonium fluoroalkanoates such as ammonium perfluorooctanoate and 3,3,4,4,5,5,6, 6,7,7,8,8,8,-tridecafluorooctylsulfonic acid, partially neutralized with ammonia.

Syntheses of Chain Transfer Agents

The chain transfer agents useful in the present invention may be prepared by several processes known to those skilled in the art. A preferred process involves the addition of alcohols to fluorine-containing olefins as illustrated in equation 1. This process is normally carried out in the presence of a catalytic amount of a base such as an alkali metal hydroxide or the alkali metal salt of the alcohol $R^1OH$. This process is discussed by M. Hudlicky in "Chemistry of Organic Fluorine Compounds", 2nd edition, Ellis Horwood, Chichester, UK, 1976, pages 285 to 290 and 407 to 410 and by L. G. Sprague in "Chemistry of Organic Fluorine Compounds II", M. Hudlicky and A. E. Pavlath, editors, American Chemical Society, Washington, DC. 1995, pages 729 to 731.

$$R^1OH + CF_2 = CF_2 \rightarrow R^1OCF_2CF_2H \qquad (eq.\ 1)$$

Synthesis of the compound $CH_3OCF_2CF_2H$ from methanol and tetrafluoroethylene by this process is disclosed in U.S. Pat. No. 3,609,196. Synthesis of the compound $CH_3CH_2OCF_2CF_2H$ from ethanol and tetrafluoroethylene is disclosed in European Patent Application EP 694523.

Chain transfer agents of formula (1) may also be obtained by reaction of fluorine-containing ketones or acid fluorides with an alkali metal fluoride and an alkylating agent of formula $R^1$–L as illustrated in equation 2.

$$R^1-L + MF + C_3F_7COF \rightarrow R^1OC_4F_9 \qquad (eq.\ 2)$$

wherein $R^1$ has the meaning defined above, L is a leaving group, and M is an alkali metal cation. A leaving group is an atom or group of atoms which, when attached to a primary or secondary carbon atom, is readily displaced by a nucleophile. Typical leaving groups include chloride, bromide, iodide, alkyl sulfates, alkyl sulfonates, arylsulfonates and trifluoromethanesulfonate anions. This process is discussed by A. E. Feiring in "Chemistry of Organic Fluorine Compounds II", M. Hudlicky and A. E. Pavlath, editors, American Chemical Society, Washington, D.C. 1995, page 82.

Chain transfer agent of formula (1) may also be obtained by reaction of a fluorine containing alcohol $R^2OH$ with an alkylating agent of formula $R^1$–L. In one example, reaction of 1,1,1,3,3,3-hexafluoro-2-propanol with dimethyl sulfate in the presence of aqueous sodium hydroxide affords a partially fluorinated ether with the formula $(CF_3)_2CHOCH_3$, as disclosed in U.S. Pat. No. 3,346,448.

Two of the chain transfer agents in the class described by the formula(1), in which $R^2$=perfluoroalkyl, are available commercially from 3M Corporation: Methoxy nonafluorobutane ($CH_3$—O—$C_4F_9$), which is sold as HFE-7100 hydrofluoroether; and ethoxy nonafluorobutane ($CH_3CH_2$—O—$C_4F_9$), which is sold as HFE-7200 hydrofluoroether. The use of HFE-7100 and HFE-7200 as polymerization media is disclosed in "Research Disclosures", January 1998, p.81, #40576. Similar hydrofluoroethers are also disclosed as polymerization media in U.S. Pat. No. 5,182,342.

Amounts of chain transfer agent used in typical polymerizations range from 0.1–100 parts per thousand (ppt), preferably 1–100 ppt, and more preferably 1–50 ppt. The parts per thousand are based on the total weight of the monomer or monomers fed to the polymerization reaction, i.e. the weight initially charged and subsequently fed to the polymerization vessel in the course of the polymerization. The chain transfer agent may be added during the initial charging of ingredients before polymerization is begun, or it may be added continuously or in portions during polymerization, or during the initial charging and in the course of the polymerization.

Of the chain transfer agents of formula (1), preferred chain transfer agents are those in which a is 2 or 3 and b is 1 or 2. It is believed that the presence of one or two hydrogen atoms in the group $R^2$ increases solubility of the chain transfer agent in water, and therefore chain transfer agents with b=1 or 2 may be especially preferred in aqueous polymerizations. More preferred are those in which $R^1$ has at least two carbon atoms at least one of which is a secondary carbon atom. A secondary carbon atom is one that is bonded to two hydrogen atoms and to two other atoms.

Polymers of this invention contain polymer chains that are terminated with endgroups characteristic of the chain transfer. agents. These endgroups are similar in formula to the chain transfer agent used, the principal difference being that the polymer chain is bonded to a carbon atom of the chain transfer agent that formerly was bonded to a hydrogen.

TEST METHODS

Relative polymer molecular weights were determined by melt index measurements in which the amount of polymer which flows through a given orifice at a specified time and temperature and under a specific weight is determined. Thus, a higher melt index number corresponds to a lower molecular weight. Melt index tests were run using a Slocomb Model F extrusion plastometer with a 316 stainless steel die 0.947 cm in diameter and with an orifice 0.318 cm long and 0.0794 cm in diameter. The plastometer was heated to 372° C. After loading about 2 g of polymer, reinserting the piston and waiting 5 minutes for thermal equilibration, the piston was loaded with dead weight so that the piston and dead weight together totaled 5, 10 or 15 kg. The time required for all or part of the sample to be extruded was measured. The weight of the polymer extruded in one minute is measured. Generally, two or three measurements are averaged and multiplied by 10. The result is reported as melt index in units of g/10 minutes. In some cases in which polymer of very low molecular weight was formed, all or part of the polymer sample extruded from the plastometer during the 5 minute equilibration time. In these cases, the melt index is reported as "high".

The number of unstable end groups was determined by infrared spectroscopy on thin polymer films which were compacted by pressing at room temperature. Peak intensities at about 1775, 1815, 1795 and 1660 $cm^{-1}$ were used to determine —COOH (dimer), —COOH (monomer), —CF=$CF_2$ and —COO$^-K^+$ concentrations, respectively. Intensity of a band at about 2365 cm–1 was used to correct absorptions for film thickness. The total of —COOH, —CF=$CF_2$ and —COO$^-K^+$ groups is reported as number of ends per $10^6$ polymeric carbon atoms ($10^6$ C).

Polymer compositions were determined by $^{19}F$ NMR spectroscopy on melted polymer samples at about 300 to 320° C. The amount of hexafluoropropylene incorporated was determined by integration of a signal at about –71 ppm ($CF_3$) versus the total of $CF_2$ absorptions in the region –105 to –130 ppm. The amount of perfluoro (ethyl vinyl ether) incorporated was similarly determined by integration of its $CF_3$ peak at about –88 ppm.

EXAMPLE 1 AND COMPARATIVE EXAMPLES A AND B

Copolymerization of Tetrafluoroethylene (TFE) and Hexafluoropropylene (HFP)

A 4-L horizontal autoclave with mechanical agitator was purged with nitrogen and charged with 2-L of distilled water, 4.48 g of ammonium perfluorooctanoate, and the chain transfer agent, if used. The amount of chain transfer agent is reported in Table 1 as parts per thousand parts of the monomers initially charged to the autoclave plus the monomers fed to the autoclave in the course of the polymerization. For convenience, Table 4 gives the volumes of chain transfer agent used in each experiment. The reactor was purged with a mixture of 70 wt. % HFP and 30 wt. % TFE while the contents were heated to 103° C. and agitated at 90 rpm. The reactor was pressured to 4.5 MPa with the above gas mixture. A solution of 4 g of ammonium persulfate initiator in 1-L of water was injected at a rate of 6 mL/minute for 12 minutes. Then a solution of 7 g of potassium persulfate initiator in 1-L of water was injected at the rate of 1 mL/minute and pressure in the reactor was maintained at 4.5 MPa by the addition of TFE. Reaction was continued until 840 g of TFE had been injected. The time from first injection of the ammonium persulfate initiator to complete addition of the tetrafluoroethylene is reported as the run time. The initiator and TFE feeds were stopped, the reactor was allowed to cool and vented to atmospheric pressure. The reactor contents were discharged, frozen in dry ice, thawed and filtered. The solid polymer was stirred with about 2-L of distilled water at about 80° C., filtered and dried in a vacuum oven overnight at about 120° C. under a flow of nitrogen. Results are reported in Table 1. For these polymers, a melt viscosity as a measure of molecular weight was calculated from the formula $$\text{melt viscosity} = (10.68)*(\text{piston}+\text{dead weight})/(\text{grams of polymer extruded in 1 min})$$

A higher melt viscosity indicates a higher molecular weight.

TABLE 1

Copolymerizations of TFE and HFP

| # | Chain Transfer Agent Formula | Amount (ppt* of monomer) | Run Time (min) | Melt Viscosity × $10^4$ (poise) | Ends/ $10^6$ C | Composition Wt. % HFP |
|---|---|---|---|---|---|---|
| 1 | $CH_3OCF_2CF_2H$ | 9.4 | 104 | 12.9 | 259 | 8.81 |
| A | None | 0 | 107 | 33.9 | 217 | 10.0 |
| B | $CHCl_3$ | unknown | 141 | 3.1 | 303 | 9.6 |

*ppt = parts per thousand

EXAMPLES 2–15 AND COMPARATIVE EXAMPLES C–G

Terpolymerization of Tetrafluoroethylene (TFE), Hexafluoropropylene (HFP) and Perfluoro(ethyl vinyl ether) (PEVE)

A 4-L horizontal autoclave with mechanical agitator was purged with nitrogen and charged with 2.2-L of distilled water and 26 g of 20 wt % solution of ammonium perfluorooctanoate in water. The reactor was purged with a mixture containing 61 wt. % HFP and 39 wt. % TFE while the contents were heated to 103° C. and agitated at 190 rpm. The reactor was pressured to 4.14 MPa with the above gas mixture. Perfluoro (ethyl vinyl ether) (12 mL) and the change-transfer agent, if used, were then pumped into the reactor. The amount of chain transfer agent is reported in Table 2 as parts per thousand parts of the monomers initially charged to the autoclave plus the monomers fed to the autoclave in the course of the polymerization. For convenience, Table 4 gives the volumes of chain transfer agent used in each experiment. A solution of 5.6 g of potassium persulfate initiator in 1-L of water was pumped into the reactor at a rate of 10 mL/min until 25 mL had been injected. Then this initiator solution was pumped into the reactor at a rate of 0.6 mL/min and PEVE was pumped in at a rate of 0.1 mL/min. The reactor pressure was maintained at 4.14 MPa by the addition of TFE until 840 g of TFE had been added. The time from first injection of the potassium persulfate initiator until complete addition of the tetrafluoroethylene is reported as the run time. The initiator and TFE feeds were stopped, the reactor was allow to cool and vented to atmospheric pressure. The reactor contents were discharged, frozen in dry ice, thawed and filtered. The solid polymer was stirred with about 2-L of distilled water at about 80° C., filtered and dried in a vacuum oven overnight at about 120° C. under a flow of nitrogen. Results are reported in Table 2. All melt index measurements in Table 2 were made with the 5 kg weight, so melt index is reported without conversion to molecular weight.

TABLE 2

Terpolymerizations of TFE, HFP and PEVE

| # | Chain Transfer Agent Formula | Amount (ppt* of monomer) | Run Time (min) | Melt Index (g/10 min) | Ends/ $10^6$ C | Composition wt. % HFP | PEVE |
|---|---|---|---|---|---|---|---|
| 2 | $CH_3CH_2OCF_2CF_2H$ | 5 | 164 | high | 290 | 5.7 | 2.7 |
| 3 | $CH_3CH_2OCF_2CF_2H$ | 2.5 | 149 | 114 | 289 | 6.3 | 2.2 |
| 4 | $CH_3CH_2OC_4F_9$ | 12 | 113 | 67.9 | 233 | 6.1 | 1.8 |
| 5 | $CH_3CH_2OC_4F_9$ | 6 | 115 | 34.8 | 256 | 6.5 | 2.1 |
| 6 | $CH_3OCF_2CF_2H$ | 32 | 167 | high | | 5.8 | 2.7 |
| 7 | $CH_3OCF_2CF_2H$ | 21 | 153 | 102 | 275 | 6.0 | 2.9 |
| 8 | $CH_3OCF_2CF_2H$ | 21 | 143 | 99.8 | 282 | 6.1 | 2.6 |
| 9 | $CH_3OCF_2CF_2H$ | 10.5 | 149 | 41.3 | | 6.0 | 2.6 |
| 10 | $CH_3OCF_2CF_2H$ | 10.5 | 163 | 46.0 | | 6.0 | 2.4 |
| 11 | $CH_3OCF_2CF_2H$ | 5.2 | 158 | 27.0 | | 6.0 | 2.5 |
| 12 | $CH_3OC_4F_9$ | 39 | 103 | 19.1 | 238 | 6.5 | 2.1 |
| 13 | $CH_3OC_4F_9$ | 39 | 116 | 20.8 | 236 | 5.7 | 2.3 |
| 14 | $CH_3OCH(CF_3)_2$ | 8 | 115 | 30.8 | | 6.2 | 2.2 |
| 15 | $CH_3OCH(CF_3)_2$ | 17 | 149 | 132 | | 6.5 | 2.5 |
| C | none | 0 | 125 | 8.9 | 239 | 6.3 | 2.4 |
| D | none | 0 | 105 | 3.2 | 220 | 6.6 | 1.7 |
| E | none | 0 | 119 | 8.8 | 249 | 6.5 | 2.3 |
| F | none | 0 | 108 | 5.0 | 229 | 6.7 | 2.0 |
| G | none | 0 | 111 | 6.7 | 240 | 6.9 | 2.0 | ppt = parts per thousand

EXAMPLES 16–22 AND COMPARATIVE EXAMPLES H–I

Terpolymerization of Tetrafluoroethylene (TFE) Hexafluoropropylene (HFP) and Perfluoro(ethyl vinyl ether) (PEVE)

The procedures of examples 2 to 15 were followed except that 15 g of a 23 wt. % solution of 3,3,4,4,5,5,6,6,7,7,8,8,8-tridecafluorooctylsulfonic acid, partially neutralized with ammonia, was used in place of the ammonium perfluorooctanoate. Results are reported in Table 3. All melt index measurements in Table 3 were made with the 5 kg weight, so melt index is reported without conversion to molecular weight.

TABLE 3

Terpolymerizations of TFE, HFP and PEVE

| | | Chain Transfer Agent | | | | Composition wt. % | |
|---|---|---|---|---|---|---|---|
| # | Formula | Amount (ppt* of monomer) | Run Time (min) | Melt Index (g/10 min) | Ends/ $10^6$ C | HFP | PEVE |
| 16 | $CH_3OCF_2CF_2H$ | 10.4 | 135 | 31.9 | 229 | 5.8 | 1.7 |
| 17 | $CH_3OCF_2CF_2H$ | 5.2 | 128 | 21.8 | 287 | 6.1 | 1.8 |
| 18 | $CH_3OC_4F_9$ | 25 | 116 | 13.7 | 219 | 6.1 | 2.0 |
| 19 | $CH_3CH_2OCF_2CF_2H$ | 5 | >180 | high | 314 | 6.0 | 3.2 |
| 20 | $CH_3CH_2OCF_2CF_2H$ | 1 | 169 | 32.7 | 282 | 6.4 | 2.3 |
| 21 | $CH_3CH_2OC_4F_9$ | 12 | >180 | high | 277 | 6.3 | 2.6 |
| 22 | $CH_3CH_2OC_4F_9$ | 6 | 162 | 67.3 | 262 | 5.8 | 2.5 |
| H | none | 0 | 129 | 10.8 | 303 | 6.4 | 2.0 |
| I | none | 0 | 132 | 9.1 | 245 | 5.9 | 2.4 | ppt = parts per thousand

TABLE 4

Volumes of Chain Transfer Agent Used in Examples

| Example Number | Chain Transfer Agent (mL) |
|---|---|
| 1 | 10 |
| A | 0 |
| B | 1.6 |
| 2 | 5 |
| 3 | 2.5 |
| 4 | 10 |
| 5 | 5 |
| 6 | 30 |
| 7 | 20 |
| 8 | 20 |
| 9 | 10 |
| 10 | 10 |
| 11 | 5 |
| 12 | 30 |
| 13 | 30 |
| 14 | 7 |
| 15 | 15 |
| C | 0 |
| D | 0 |
| E | 0 |
| F | 0 |
| G | 0 |
| 16 | 10 |
| 17 | 5 |
| 18 | 20 |
| 19 | 5 |
| 20 | 1 |
| 21 | 10 |
| 22 | 5 |
| H | 0 |
| I | 0 |
| 23 | 8.8 |

EXAMPLE 23: INITIATION WITH PERFLUOROBUTANESULFINATE SALT

Copolymerization of Tetrafluoroethylene (TFE) and Hexafluoropropylene (HFP)

A 4-L horizontal autoclave with mechanical agitator was purged with nitrogen and charged with 2-L of distilled water, 4.48 g of ammonium perfluorooctanoate and the chain transfer agent, $CH_3OCF_2CF_2H$ (11.0 g). The chain transfer agent was 9.6 ppt of the total of the monomers charged and fed to the autoclave in this polymerization. The reactor was purged with a mixture of 70 wt. % HFP and 30 wt. % TFE while the contents were heated to 103° C. and agitated at 90 rpm. The reactor was pressured to 4.5 MPa with the above gas mixture. This charge amounted to 144 g TFE and 336 g of HFP. A solution of 4 g of ammonium persulfate initiator in 1-L of water was injected at a rate of 6 mL/minute for 3 minutes. Then a solution of ammonium perfluorobutanesulfinate (15 g/liter) and a solution of sodium bromate (10.4 g/liter) were added independently, each at 0.6 mL/min for the remainder of the batch. Pressure in the reactor was maintained at 4.5 MPa by the addition of TFE which was continued in this example until 660 g of TFE had been injected (run time=163 min). The initiator and TFE feeds were stopped, the reactor was allow to cool and was then vented to atmospheric pressure. The reactor contents were discharged, frozen in dry ice, thawed and filtered. The solid polymer was isolated as described in Example 1. Copolymer composition consisted of 8.9 wt. % HFP, 91.1 wt. % TFE, with melt viscosity determined as 3.5×10⁴ poise. Comparative runs using similar molar quantities of sulfinate salt initiator but with no chain transfer agent afforded copolymer with higher melt viscosity, illustrating the effectiveness of chain transfer agent $CH_3OCF_2CF_2H$ with alternate initiators.

EXAMPLES 24–28 AND COMPARATIVE EXAMPLE J

Terpolymerization of Tetrafluoroethylene (TFE), Hexafluoropropylene (HFP) and Perfluoro(ethyl vinyl ether) (PEVE) in 10-gallon Autoclave A 10-gallon horizontal autoclave with mechanical agitator was purged with nitrogen and charged with 48 lb. (22 kg) of distilled water and 200 grams of a 20 wt % solution of ammonium perfluorooctanoate in water. The reactor was purged with TFE while the contents were heated to 65° C. and agitated at 50 RPM. A vacuum was pulled on the reactor, and then the chain transfer agent was drawn in through a charge pot in the amount reported in Table 5 as parts per thousand parts of the monomers initially charged to the autoclave plus the monomers fed to the autoclave in the course of the polymerization. The reactor temperature was raised to 103° C. and agitated at 50 RPM. Perfluoro(ethyl vinyl ether) (130 mL) was then pumped into the reactor. The autoclave was then pressured to 380 psig (2.7 MPa) with HFP and then to 635 psig (4.48 MPa) with TFE. A 5.4 g/L of potassium persulfate initiator was pumped into the reactor at a rate of 50 mL/min until 190 mL was added. The initiator pump rate was then reduced to 4.4 mL/min for the remainder of the reaction period. Perfluoro(ethyl vinyl ether) was also added at a rate of 1.0 mL/min for the remainder of the batch. Pressure was maintained between 550–650 psig (3.9–4.6 MPa) by feeding TFE until a total of 18.0 lb. (8.16 kg) of TFE were fed. TFE and initiator feeds were stopped and the reactor was cooled to 90° C. before slowly venting the contents to atmospheric pressure. The reactor contents were discharged. Polymer isolation was accomplished by shear coagulation, followed by 24 hours of drying at 150° C. in an open air oven. Results are reported in Table 5.

TABLE 5

Terpolymerization with TFE, HFP, PEVE in 10-L autoclave.

| Example # | Formula | Amount mL | ppt* | Melt Index (g/10 min.) | Ends/ 10⁶ C | Composition Wt % HFP | PEVE |
|---|---|---|---|---|---|---|---|
| 24 | $CH_3CH_2OCF_2CF_2H$ | 22 | 2.9 | 10.4 | 119 | 5.1 | 1.8 |
| 25 | $CH_3CH_2OCF_2CF_2H$ | 45 | 5.9 | 19.9 | 92 | 5.4 | 1.9 |
| 26 | $CH_3OCH(CF_3)_2$ | 22 | 3.0 | 4.3 | 188 | 6.4 | 1.8 |
| 27 | $CH_3OCH(CF_3)_2$ | 52 | 7.1 | 7.9 | 128 | 7.0 | 1.9 |

TABLE 5-continued

Terpolymerization with TFE, HFP, PEVE in 10-L autoclave.

| Example # | Formula | Amount mL | ppt* | Melt Index (g/10 min.) | Ends/ 10⁶ C | Composition Wt % HFP | PEVE |
|---|---|---|---|---|---|---|---|
| 28 | Chloroform | 30 | 3.9 | 11.2 | 114 | 5.1 | 1.6 |
| J | none | 0 | 0 | 1.3 | 108 | 6.7 | 2.0 |

*ppt - parts per thousand of monomers

The examples show that the chlorine-free, liquid chain transfer agents of this invention are effective in controlling the molecular weights of fluoropolymers, including TFE/HFP and TFE/HFP/PPVE, in polymerizations using different initiators and surfactants.

What is claimed is:

1. A process comprising polymerizing a fluoromonomer comprising an olefin which contains at least one fluorine atom on an olefinic carbon in the presence of a polymerization initiator and chain transfer agent, said chain transfer having the structure $$R^1\text{—}O\text{—}R^2$$

where $R^1$ is a straight chain or branched saturated hydrocarbon group of 1 to 6 carbon atoms with the proviso that there is at least one hydrogen atom attached to the carbon next to oxygen, and $R^2$ is a straight chain or branched fluorocarbon group or hydrofluorocarbon group of formula $C_aH_bF_c$ wherein a is 2 to 6, b is 0 to 2a−1 and c is 2 to 2a+1 with the proviso that b+c=2a+1, said polymerizing being carried out in a liquid polymerization medium which is not said chain transfer agent.

2. A polymer made by the process of claim 1.

3. The process of claim 1 wherein hydrocarbon monomer is present.

4. The process of claim 1 wherein said polymerization is carried out in said polymerizaion medium to which said olefin, initiator, and chain transfer agent are added.

5. The process of claim 1 wherein $R^2$ is $CF_2CF_2H$ or $CH(CF_3)_2$.

6. The process of claim 5 wherein $R^1$ is methyl or ethyl.

7. The process of claim 1 wherein the amount of chain transfer agent present is 0.1–100 parts per thousand based on the total weight of monomer feed to said process.

8. The process of claim 1 wherein said polymerization medium is an aqueous medium.

9. The process of claim 1 wherein $R^1$ has at least two carbon atoms, at least one of said carbon atoms being a secondary carbon atom.

10. The process of claim 1 wherein said chain transfer agent is selected from the group consisting of $CH_3OC_4F_9$ and $CH_3CH_2OC_4F_9$.

* * * * *